United States Patent Office 3,474,716
Patented Oct. 28, 1969

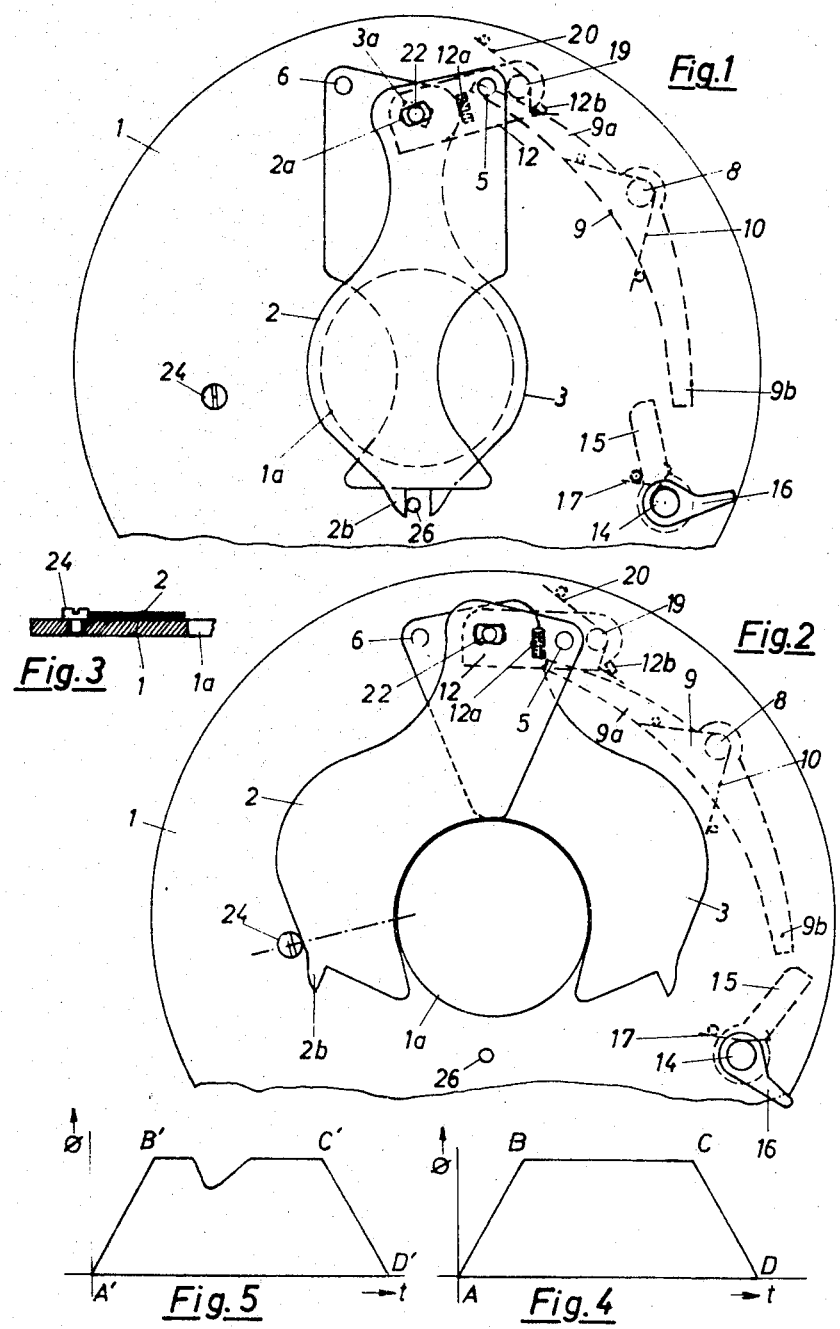

3,474,716
PHOTOGRAPHIC SHUTTER
Richard Wurster, Hofen (Enz), Germany, assignor to Prontor-Werk Alfred Gauthier GmbH, Calmbach, Schwarzwald, Germany, a corporation of Germany
Filed Jan. 18, 1967, Ser. No. 610,077
Claims priority, application Germany, Jan. 29, 1966, P 38,660
U.S. Cl. G03b 9/14
U.S. Cl. 95—62         3 Claims

ABSTRACT OF THE DISCLOSURE

A photographic shutter comprising at least two blades which can be set into swinging motion by a driving device wherein only one of the shutter blades is associated with a reflex stop for limiting its swing-out motion and for imparting a closing impulse thereto in order to achieve relatively short exposure times and to provide continuous transition from the opening to the closing movement in the reversing phase of the shutter blades when relatively longer exposure times are formed by a braking device acting on the driving device. This continuous transition is achieved because the other blade or blades do not receive a closing impulse from the reflex stop and their opening momentum tends to dampen the closing impulse provided by the reflex stop.

---

The invention concerns a photographic shutter with a shutter blade system comprising at least two blades, which can be set into swinging motion by a driving device.

In shutters of this type it is conventional to utilize what is known as the rebound effect in order to achieve a particularly short exposure time. In previous devices, in order to realize this effect each shutter blade in a shutter of the above type has been associated with a reflex stop which returns the respective blade after opening of the exposure aperture. This rebound effect, which is desirable to obtain relatively short exposure times, exists also in those exposure times which are regulated by a braking device. It was found that when the exposure times are controlled by a braking device, highly objectional fluttering of the shutter blades occurs in their reversing phase due to the fact that during this phase the shutter blades lead the driving lever which is braked by the braking device whereby the blades swing in prematurely over the exposure aperture, to be returned subsequently again to the full swing-out position by the lagging driving lever.

It is an object of this invention to eliminate these disadvantages, that is, to provide a shutter utilizing the rebound effect in order to achieve a particularly short exposure time that ensures a satisfactory method of operation by avoiding diagram errors even when the exposure times are formed by a braking device.

It has been found that the foregoing object and other advantages can be readily attained in a photographic shutter wherein only one of the shutter blades is associated with a reflex stop limiting its swing-out movement. This provides the prerequisites which permits, on the one hand, the utilization of the rebound effect caused by a reflex stop to achieve particularly short exposure times, and on the other hand, continuous transition from the opening to the closing movement in the reversing phase of the shutter blades at those exposure times which are formed by a braking device. This in turn ensures a satisfactory operation at all exposure times, positively avoiding any diagram errors.

Other objects and advantages will be readily apparent from the following detailed description and the attached drawings wherein:

FIGURE 1 is a fragmentary top view of the self-cocking shutter of this invention equipped with two swinging shutter blades in starting position with the cover plate removed.

FIGURE 2 is a view similar to FIGURE 1 with the self-cocking shutter in the reversing phase of the shutter blades, wherein the driving lever is delayed by a braking device (not illustrated).

FIGURE 3 shows a partial cross-sectional view through the arrangement of FIGURE 2.

FIGURE 4 illustrates an opening surface-time diagram of a shutter system equipped with only one reflex stop.

FIGURE 5 illustrates the comparison diagram of a known shutter where each shutter blade cooperates with a reflex stop in the reversing phase.

Referring now to the drawings there is illustrated a photographic shutter having a base plate, designated by the reference numeral 1 provided with an exposure aperture 1a, and having arranged thereon a shutter blade system which comprises two shutter blades 2 and 3 which are mounted for swing-out movement on pins 5 and 6 respectively.

A driving device is provided to set the shutter blades 2 and 3 into a swinging motion during the exposure. For this purpose a two-arm driving lever 9 is pivotally mounted on a pin 8, and is biased in a clockwise direction by a driving spring 10. One arm 9a cooperates with a shutter blade-actuating element 12 designed as a lever, and the other arm 9b is associated operatively with a cocking and release device. The latter comprises a cocking shaft 14 rotatably mounted on the base plate 1, to the shaft 14 there is a carrier arm 15 fixedly attached on one side of the base plate 1a. On the other side of the base plate 1 an arm 16 is also fixedly mounted on the shaft 14 and cooperates with the cocking and release element (not shown). The carrier arm 15 and the arm 16 are held in the starting position illustrated in FIGURE 1 by means of a spring 17.

The shutter blade-actuating lever 12 cooperating with the driving lever 9 is pivotally mounted on a pin 19 secured in the base plate 1 and is biased in a counter-clockwise direction by a closing spring 20. On the shutter blade-actuating lever 12 there are provided two lugs 12a and 12b on which the driving lever 9 bears successively when moving from its cocked position so that the shutter blade-actuating lever 12 is moved into swinging motion. The operative connection of the shutter blade-actuating lever 12 with the shutter blades 2 and 3 is effected by means of a carrier pin 22 secured on the lever 12 and engaged with slots 2a and 3a respectively on each of these blades.

In order to obtain different exposure times, the driving lever 9 is associated with a conventional braking device (not shown) which engages the driving lever 9 as it moves from its cocked position. This engagement usually occurs shortly before reaching the open position of the shutter blades 2 and 3, over a shorter or longer path of motion depending on the preselected exposure time, so that the driving lever 9 is temporarily braked in its movement.

In order to obtain a particularly short exposure time with the braking device shut off, the well-known rebound effect is used. For this purpose a reflex stop 24 may be provided which is secured on the base plate 1 and cooperates, as will be explained below, with a single shutter blade of the shutter blade system 2, 3. In the disclosed embodiment the shutter blade 2 strikes against the stop 24 immediately after the uncovering of the exposure aperture by the two shutter blades 2 and 3. To fix the shutter blades in the closed position, an additional pin 26 is provided, secured on the base plate 1, which bears on only one shutter blade, such as against shutter blade 2, in the closed position. The arrangement is such that the pin 26 is disposed slightly outside the axis of symmetry of the two shutter blades 2 and 3, so that only the shutter blade 2 strikes the pin 26 with a projection 2b in the closed position whereby both shutter blades 2 and 3 can thus have the same shape.

When the cocking and release element is actuated, the driving lever 9 is turned counterclockwise by means of the cocking shaft 14 and the carrier arm 15, thereby increasing the tension of the driving spring 10. The arm 9a slides over the inclined edge of the lug 12a and snaps into a position adjacent the lug 12a. Toward the end of the cocking movement, the carrier arm 15 is disengaged from the arm 9b of the driving lever 9 so that the latter can return clockwise under the influence of the driving spring 10. The arm 9a engages the lug 12a and carries along the shutter blade-actuating lever 12 in the same direction of rotation, which results in the shutter blades 2 and 3 moving into the open position.

If an exposure time is set which is formed by the braking device, (not shown), the driving lever 9 engages the braking device toward the end of the opening movement of the shutter blades 2 and 3 and is at first delayed thereby, while the two shutter blades together with the lever 12 continue their swing-out movement under the influence of kinetic energy. After uncovering the exposure aperture 1a, the shutter blade 2 strikes the reflex stop 24, as illustrated in FIGURES 2 and 3, thereby imparting to this blade, a closing impulse, while the shutter blade 3 has the tendency to continue its movement. This action results in an advantageous delay in the closing movement of the shutter blade system 2, 3 caused by the closing impulse imparted to the blade 2 by the reflex stop 24, so that the driving lever 9 has time to follow the shutter blade-actuating lever 12 and to engage its lug 12b. The driving lever 9, which is now unbraked, causes acceleration of the shutter blade-actuating lever 12 in a counterclockwise direction whereby the shutter blades 2 and 3 are moved again to the closed position. When this position is reached, the shutter blade 2 strikes the pin 26 with its projection 2b and receives from the latter a small opening impulse, which is compensated for by blade 3 which is not intercepted, so that the shutter cannot open again after it is closed.

An opening surface-time diagram for an exposure time controlled by the braking device, resulting in the exposure course of a shutter designed according to the embodiment illustrated in FIGURES 1 to 3, is represented in FIG. 4 and has the form limited by the points A, B, C, and D. Here the obliquely rising line A B represents the opening time, the horizontal line B–C the open time, and finally the descending line C–D represents the closing time of the shutter.

If a reflex stop is assigned to each shutter blade as is customary, an undesirable phase displacement will result during the reversing phase between the movement of the driving lever 9 and the shutter blade-actuating lever 12 when the set exposure time is regulated by the braking device. This occurs because the shutter blades are thrown back to the center of the shutter immediately after striking the reflex stops, while the driving lever is braked by the braking device. The shutter blades therefore partly recover the exposure aperture after it has been completely uncovered and are then returned again to the uncovered position by the lagging driving lever 9 to the full swing-out position. After leaving the lug 12a, the arm 9a of the driving lever 9 strikes the lug 12b, so that the shutter blades return again into the closing position.

The desirable fluttering of the shutter blades in the reversing phase caused by the assignment of one reflex stop each to the shutter blades can also be seen in the opening surface-time diagram illustrated in FIGURE 5. While in both cases, assuming equally set exposure times, the opening and closing times A–B, C–D, and A'–B', C'–D' respectively can be considered as equal, however, the line B'–C' representing the open time has a break directed toward the time axis of the diagram, which is caused by the objectional premature swinging-in of the shutter blades over the exposure aperture, which this invention has eliminated.

It will be understood that the foregoing description with the details of exemplary structure is not to be construed in any way to limit the invention, but that modifications may be made thereto without departing from the scope of the invention as set forth in the following claims.

Having thus described the invention, I claim:

1. A photographic shutter comprising a shutter blade system having at least two cooperating shutter blades; a driving device operably engageable with said shutter blade system for imparting swinging motion to said blades; and a reflex stop only engageable by one of said shutter blades for limiting the swing-out motion.

2. A photographic shutter comprising support means; shutter means on said support means having a plurality of cooperating shutter blades; driving means on said support means engageable with said shutter means for imparting swinging motion thereto; and a reflex stop on said support means engageable with one of said shutter blades to limit the swing-out position of said shutter means and to impart a closing impulse to said one of said shutter blades.

3. The photographic shutter of claim 2 wherein said support means comprises a base plate having an exposure aperture, and wherein said shutter means comprises a pair of shutter blades pivotally mounted on said base plate to open and close said exposure aperture, and wherein one of said shutter blades is engageable with said reflex stop to limit the swing-out position of said one of said shutter blades and to impart a closing impulse thereto, and wherein the other of said blades is operably engaged with said one of said blades so that its opening momentum tends to dampen the closing impulse provided by said reflex stop.

References Cited

UNITED STATES PATENTS

| | | | |
|---|---|---|---|
| 3,033,092 | 5/1962 | Ernisse et al. | 95—59 |
| 3,251,288 | 5/1966 | Kitai | 95—62 |

NORTON ANSHER, Primary Examiner

D. B. WEBSTER, Assistant Examiner

U.S. Cl. X.R.

95—59